US006246195B1

(12) United States Patent
Kloesters

(10) Patent No.: US 6,246,195 B1
(45) Date of Patent: Jun. 12, 2001

(54) METHOD AND APPARATUS FOR LOWERING A POWER WINDOW

(75) Inventor: Elmar Kloesters, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/397,121

(22) Filed: Sep. 16, 1999

(30) Foreign Application Priority Data

Oct. 22, 1998 (DE) ................................................ 198 48 652

(51) Int. Cl.[7] ................................ E02F 9/16; B60R 25/00

(52) U.S. Cl. .......................... 318/280; 318/466; 318/468; 318/282; 318/266; 49/28

(58) Field of Search .................................... 318/283, 286, 318/430–493; 250/19 R–30 R; 475/149; 477/11; 49/26–28, 348, 349, 352; 341/16

(56) References Cited

U.S. PATENT DOCUMENTS

| | | | | |
|---|---|---|---|---|
| 5,381,065 | * | 1/1995 | Jones | 318/454 |
| 5,404,673 | * | 4/1995 | Takeda et al. | 49/28 |
| 5,640,072 | * | 6/1997 | Miyazaki et al. | 318/282 |
| 5,682,090 | * | 10/1997 | Shigematsu et al. | 318/468 |
| 5,689,160 | * | 11/1997 | Shigematsu et al. | 318/281 |
| 5,740,630 | * | 4/1998 | Medebach | 49/352 |
| 5,818,358 | * | 10/1998 | Torii et al. | 341/16 |
| 5,832,664 | * | 11/1998 | Tajima et al. | 49/26 |
| 5,907,139 | * | 5/1999 | Fukatsu et al. | 200/19 R |
| 5,986,421 | * | 11/1999 | Fukazawa et al. | 318/466 |
| 5,994,858 | * | 11/1999 | Miura | 318/283 |

FOREIGN PATENT DOCUMENTS

| | | |
|---|---|---|
| 3301071C2 | 7/1987 | (DE) . |
| 19632910C1 | 10/1997 | (DE) . |

* cited by examiner

*Primary Examiner*—Paul Ip
(74) *Attorney, Agent, or Firm*—Evenson, McKeown, Edwards & Lenahan, P.L.L.C.

(57) ABSTRACT

A method and apparatus for lowering a power window for vehicles is provided. In order to provide a method for lowering a power window which is improved with respect to the lowering movement of the window, system slacks are first determined in an operating device of the window and, when an unlocking of the vehicle is detected, for example, by the operation of a door lock or by the radio operation of a central locking system, the system slacks are eliminated in the lowering direction of the window by the corresponding control of the operating device.

22 Claims, 3 Drawing Sheets

METHOD AND APPARATUS FOR LOWERING A POWER WINDOW

This application claims the priority of German application 1908 48 652.9, filed Oct. 22, 1998, the disclosure of which is expressly incorporated by reference herein.

BACKGROUND AND SUMMARY OF THE INVENTION

The invention relates to a method and apparatus for lowering a power window.

In the case of the method for the no-contact reaching of the lower stop position of a power window of a motor vehicle disclosed in German Patent Document DE 196 32 910 C1, it is known to determine system slacks of the window lift mechanism in that, after a closing of the window during the triggering of the drive in the opening direction in a first phase of the adjusting movement, which does not yet result in a displacement of the window, the movement of the driving device is determined and stored as a system slack. When using this system slack, it is suggested that, when a switch-off point is reached during the lowering of the window, for securing this position, the drive is automatically controlled in the lifting direction (closing window) until the system slacks caused by the adjustment of the window in the lowering direction are compensated. As a result, the lift mechanism is braced in the lifting direction and the window is secured in its position against an unintentional lowering, for example, as the result of shocks or vibrations.

In the case of vehicles in which the doors to be opened have a frameless construction, the window engages in a vehicle-body-fixed seal in the closed condition. For safety sealing purposes, for avoiding wind noises and not least for theft protection, such door windows, beyond resting against the seal, are pressed against the seal so that, in the closed condition, the driving mechanism of the window is braced and the window is prestressed. For opening the door, it is required to eliminate the braced condition and, in addition, lower the window by a defined amount in order to disengage the window in this manner from the vehicle-body-fixed seal. This movement, which is also called a short-stroke lowering, is triggered as a rule by operating the door opener.

It is an object of the invention to provide, based on the above-mentioned state of the art, a method for lowering a power window which is improved with respect to the lowering movement of the window.

This object is achieved by preferred embodiments according to the invention, wherein it is suggested to first determine system slacks in an operating device of the window and, when an unlocking of the vehicle, for example, by operating a door lock or by the radio operation of a central locking system, is detected, to eliminate the system slack in the lowering direction of the window by a corresponding control of the operating device. It is advantageously achieved thereby that, during a short-stroke lowering of the window required for opening the door, bracings and system slacks must not first be overcome, but the lowering of the window can start immediately. In the case of an example vehicle, the time saved as the result of the above amounts to 125 ms and contributes to a considerable improvement of the opening action of the door and to a reduction of the stressing of vehicle-body-fixed seals, particularly when the door is opened fast.

Advantageous further developments of preferred embodiments of the invention are described herein and in the claims.

Thus, for determining the system slack, it is suggested that the movement of the window be monitored. When the window is essentially no longer moved, the driving movement of the operating device is monitored and the thus determined driving movement is stored as a system slack. By lowering the window by the system slack determined in such a manner, the window is again brought to the point at which it just rests against the vehicle-body-fixed seal. The monitoring of the movement of the window takes place, for example, according to the method known from German Patent Document DE 196 32 910 C1 (Recognizing the System Slacks As the Result of Bracing).

Another possibility for determining the system slack consists of determining, after a reversal of the moving direction of the window, the driving movement of the operating device from the point in time of the reversal of the moving direction to the recognition of the driving movement of the window and storing the thus obtained value for the driving movement as a system slack. Here also, the monitoring of the movement of the window can take place, for example, according to the method known from German Patent Document DE 196 32 910 C1.

The above-described methods for determining the system slacks can also be used in a manner in which they supplement one another. While, according to the first method, mainly the system slacks resulting from the bracing of the operating device are determined, the second method furnishes the system slacks which result from mechanical tolerances within the operating device. If, when the system slacks are eliminated, only the system slacks determined by means of the first method are taken into account, the window rests without tension on the vehicle-body-fixed seal, but first the slacks of the operating device resulting from the mechanical tolerances must be passed through for a lowering movement. A parallel determination of both system slacks is therefore particularly preferable as well as the elimination of the sum of both system slacks in the lowering direction of the window when the vehicle is unlocked.

If, after the elimination of the system slack, an operation of the door opener is detected, the window is at least partially lowered in order to securely disengage the window from the vehicle-body-fixed seal. After a closing of the door was detected, in which case the door opener must naturally no longer be operated, the window is again completely lifted and braced against the vehicle-body-fixed seal. Subsequently, an elimination of the system slack takes place again in the opening direction of the window. As the result of this approach, it is advantageously ensured that, when the vehicle is unlocked, a further opening of the door, which follows the first opening, takes place without any interlocking of the window with the vehicle-body-fixed seal.

In a supplementary manner, it is suggested to again lift the window completely, that is, to the braced condition, when a speed of the vehicle exceeds a defined limit value. If the speed fails again below this limit value, the system slacks are eliminated again in the above-described manner. This leads to the advantage that, on the one hand, when the vehicle is stopped, the door can be opened without any interlocking of the window with the vehicle-body-fixed seal and, on the other hand, when the vehicle is driving, a secure sealing-off and a suppression of wind noises is ensured by the bracing of the window in the vehicle-body-fixed seal.

As an alternative, it is suggested to not completely lift the window when the defined limit value for the vehicle speed is exceeded, but to only compensate the tolerance-caused system slack plus a portion of the bracing-caused system slack. This can also take place in that the window is first completely lifted and then a portion of the system slack is eliminated in that the operating device is operated by a defined amount in the lowering direction of the window. In this case also, after a falling below the defined limit value of the vehicle speed, the system slack is again completely eliminated. In this approach, when the vehicle is moving, the window is only slightly braced against the vehicle-body-side seal. This bracing is sufficient for ensuring a secure sealing-off and low wind noises. It is also sufficient for securely fixing the window by pressing it against the vehicle-body-fixed seal. In contrast, the stronger bracing applied after the closing-off of the vehicle by the complete lifting of the window represents an optimal protection against theft. As the result of the fact that the complete bracing is now only still applied after the shutting-off of the vehicle, the stressing of the operating device as well as of the vehicle-body-fixed seal is advantageously reduced.

Other objects, advantages and novel features of the present invention will become apparent from the following detailed description of the invention when considered in conjunction with the accompanying drawings.

DETAILED DESCRIPTION OF THE DRAWINGS

Figure 1:
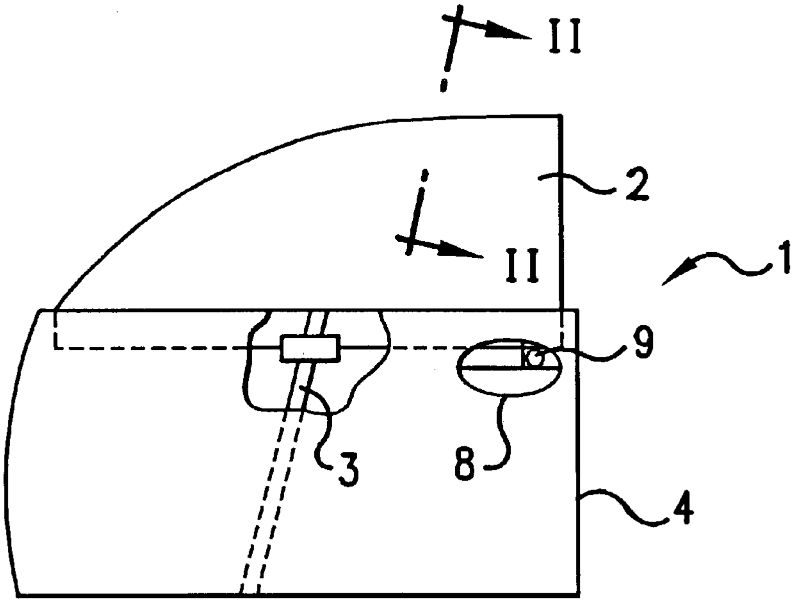
FIG. 1 is a lateral view of a door of a vehicle with a window held in a frameless manner, depicting an arrangement according to preferred embodiments of the invention.

A door 1, which is illustrated in FIG. 1, of a motor vehicle, which is not shown in detail, is provided with a window 2 which is held in a door body 4 to be lowerable by means of an operating device 3. As illustrated in the sectional view according to FIG. 2, the window 2 engages by means of its upper edge 5 in a recess 6 of a vehicle-body-fixed seal 7. A handle 8 for opening the door 1 and a lock 9 for unlocking the vehicle are also arranged on the door body 4.

Figure 2:
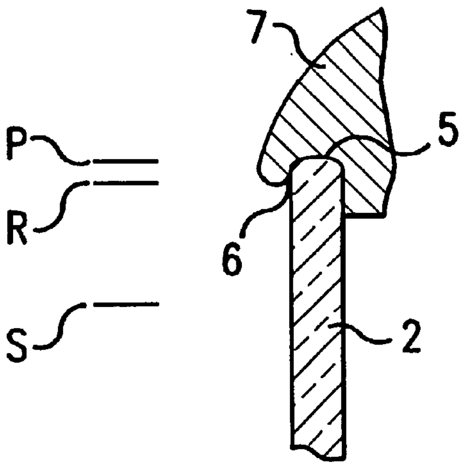
FIG. 2 is a sectional view according to Line II—II of FIG. 1.

In the locked condition of the vehicle, the upper edge 5 of the window is in position P illustrated in FIG. 2. In this case, the upper edge 5 of the window engages in the recess 6 of the seal 7 and, in addition, the upper edge 5 of the window is braced against the seal 7. Position R indicates all positions of the upper edge 5 of the window in which the upper edge 5 of the window rests in the recess 6 without any bracing. The path difference between position P and position R is small and is the result of the elastic deformation of the seal 7. For opening the door 1, the upper edge 5 of the window must be brought into position S in order to securely disengage on all sides from the recess 6 of the seal 7. Finally, a position Q is provided which corresponds approximately to position P, but in the case of which the prestressing applied to the upper edge S of the window is reduced in comparison to the prestressing applied in position P.

Figure 3:
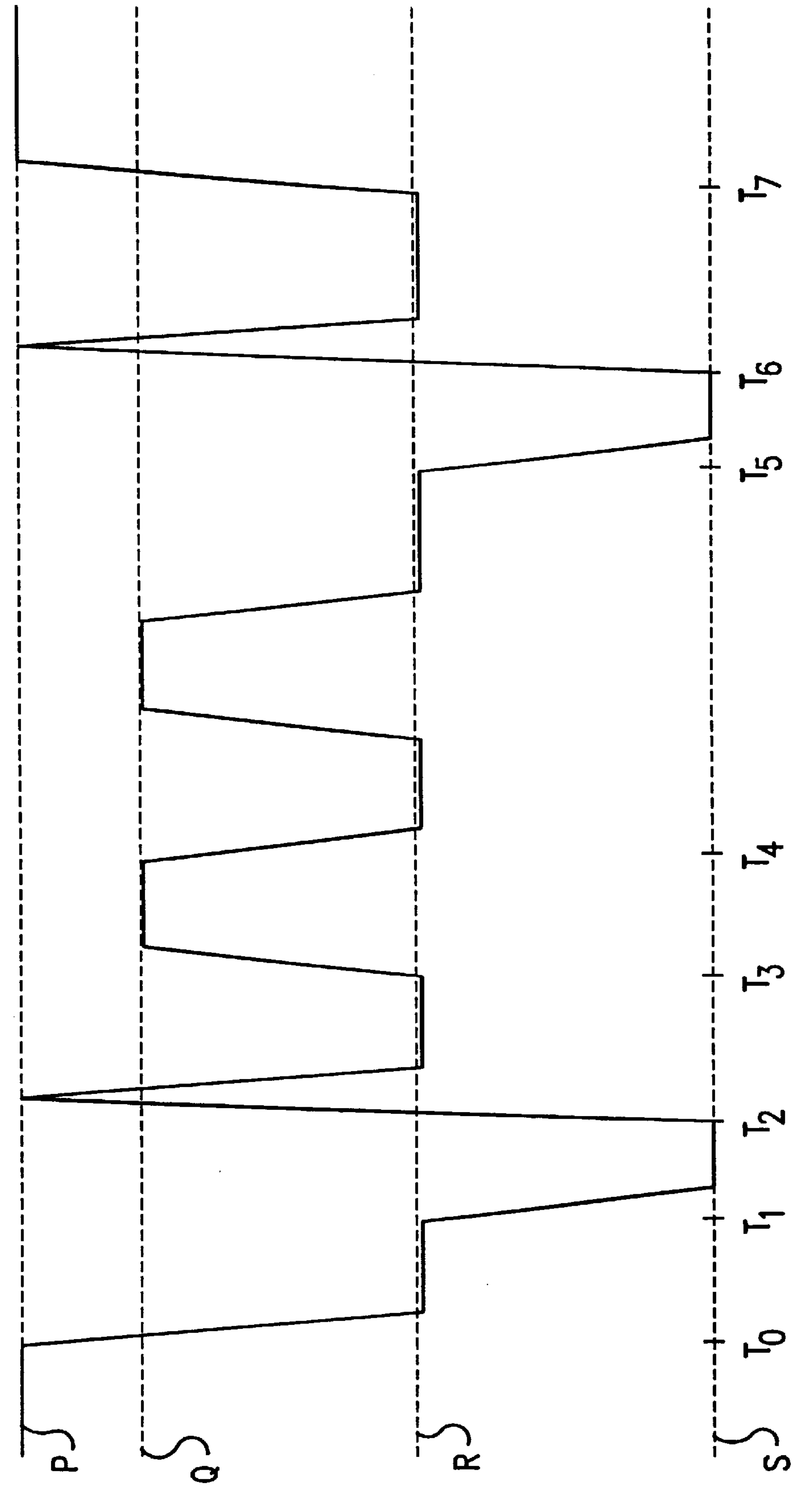
FIG. 3 is a view of the time sequence of the movements for a lowering of the window in accordance with preferred embodiments of the invention.

FIG. 3 shows an example of a time sequence of the lowering of the window 2. At the point in time $T_0$, the vehicle is unlocked by the operation of the door lock 9 and the upper edge 5 of the window is brought into position R. At the point in time $T_1$, the door handle 8 is operated and the upper edge 5 of the window is further lowered to position S. At the point in time $T_2$, a closing of the door 1 is detected; the window 2 is completely lifted until it reaches position P; and it is then lowered again to position R. At the point in time $T_3$, the vehicle starts to move and exceeds a defined speed threshold of 5 km/h. Upon the exceeding of this speed threshold value, the upper edge 5 of the window is brought into position Q. As soon as the vehicle, for example, at the point in time $T_4$, again falls below the speed threshold, the window 2 is again brought into the position R. At the point in time $T_5$, the vehicle is stopped, and the door handle 8 is operated again, this time from the interior side of the vehicle. The window 2 is then brought into position S. At the point in time $T_6$, the door is closed and the window 2 is completely lifted again into position P in order to subsequently be lowered to position S. At the point in time $T_7$, the vehicle is locked by the door lock 9 and the window 2 is brought into position P.

It should be stressed, that in positions P, Q and S, the operating device 3 is in a movement in the direction of lifting the window 2. As the result of the compensation of tolerance-caused system slacks within the operating device 3, the window 2 is therefore secured in positions P, Q and S against an unintentional lowering. In contrast, in position R, the operating device 3 is operated in the sense of a lowering of the window 2. A further lowering of the window 2 in the direction of position S can therefore take place without any previous overcoming of the tolerance-caused system slacks.

Figure 4:
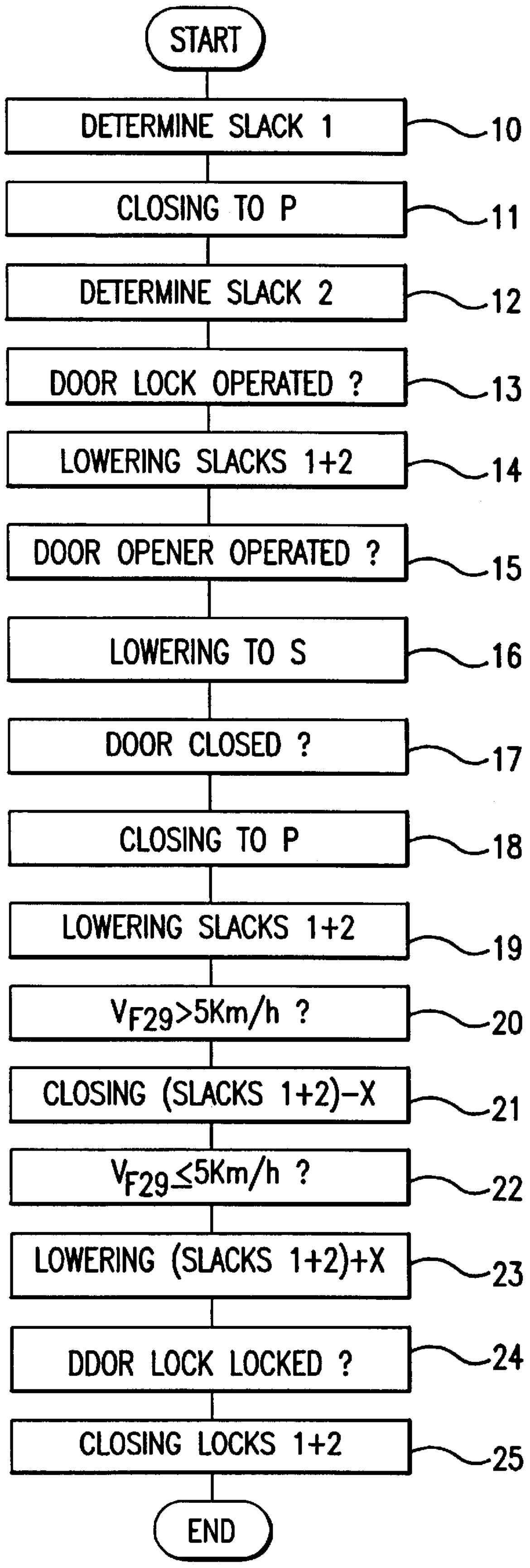
FIG. 4 is a flow chart for a lowering of the window in accordance with preferred embodiments of the invention.

FIG. 4 finally shows the method according to the invention in the form of a flow chart. In a method known from German Patent Document DE 196 32 910 C1, system slacks 1 are determined in an initiating step which result from mechanical tolerances of the operating device. At an arbitrary point in time, in step 11, the window 2 is completely lifted to position P. The difference between the reaching of position R and of position P is determined as a system slack 2 and stored and corresponds to the path of the window 2 resulting from the elastic deformation of the seal 7. Since the moving speed of the window 2 and particularly the stressing of the operating device 3 clearly changes when position R is reached, here also, the application of the method of German Patent Document DE 196 32 910 C1 is possible for determining the system slack 2. In step 13, the operation of the door lock 9 is detected, whereupon, in step 14, the window 2 is lowered by the system slacks 1 and 2 into position R. In step 15, an operation of the door opener 8 is detected and, in step 16, the window 2 is lowered into position S. In step 17, a closing of the door 1 is detected and then. in step 18, the window is lifted into position P in order to then again, in step 19, be lowered by the systems slacks 1 and 2 into position R.

In step 20, it is tested whether the vehicle exceeds a speed threshold of 5 km/h. If this is so, in step 21, the window 2 is brought by the system slacks 1 and 2, but this time reduced by an amount X, into position Q. In step 22, it is monitored whether the vehicle again falls below the speed threshold of 5 km/h. In this case, in step 23, the window 2 is again brought into position R in that the window 2 is lowered by system slacks 1 and 2 plus X. In step 24, it is monitored whether the vehicle is locked by means of the door lock 9. If a locking of the vehicle is detected, in step 25, the window 2 is then returned into position P by a lifting by the system slacks 1 and 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of controlling opening and closing movements of a window in a frameless vehicle door having an operating device operable to move the window between an upper closed position with the window engaged against a vehicle body side elastic seal and a lower open position out of engagement with the elastic seal, said method comprising:
 - determining system slacks in the operating device of the window,
 - detecting an unlocking of the vehicle door, and
 - eliminating the system slacks in a direction of lowering the window as a function of unlocking the vehicle door.

2. Method according to claim 1, wherein the system slacks are determined by:
 - monitoring the movement of the window in a lifting direction toward the upper closed position,
 - determining driving movement of the operating device when the window is essentially no longer moved after reaching the upper closed position, and
 - storing this driving movement as a system slack.

3. Method according to claim 2, wherein said method includes:
 - an at least partial lowering of the window when a door opener is operated,
 - completely lifting the window when a door is closed and the door opener is not operated, and
 - eliminating the system slacks in the direction of a lowering of the window.

4. Method according to claim 3, wherein said method includes:
 - detecting a vehicle traveling speed,
 - lifting of the window toward the upper closed position when the vehicle traveling speed exceeds a defined limit value, and
 - eliminating the system slacks in the direction of a lowering of the window when the vehicle traveling speed falls below the defined limit value.

5. Method according to claim 1, wherein the system slacks are determined by:
 - monitoring the movement of the window in the sense of a reversal of the moving direction,
 - monitoring the movement of the window if a reversal of the moving direction is detected,
 - determining the driving movement of the operating device from the point in time of the reversal of the moving direction to the detecting of a driving movement of the window, and
 - storing this driving movement as a system slack.

6. Method according to claim 5, wherein said method includes:
 - an at least partial lowering of the window when a door opener is operated,
 - completely lifting the window when a door is closed and the door opener is not operated, and
 - eliminating the system slacks in the direction of a lowering of the window.

7. Method according to claim 6, wherein said method includes:
 - detecting a vehicle traveling speed,
 - lifting of the window toward the upper closed position when the vehicle traveling speed exceeds a defined limit value, and
 - eliminating the system slacks in the direction of a lowering of the window when the vehicle traveling speed falls below the defined limit value.

8. Method according to claim 1, wherein said method includes:
 - an at least partial lowering of the window when a door opener is operated,
 - completely lifting the window when a door is closed and the door opener is not operated, and
 - eliminating the system slacks in the direction of a lowering of the window.

9. Method according to claim 8, wherein said method includes:
 - detecting a vehicle travelling speed,
 - lifting of the window toward the upper closed position when the vehicle traveling speed exceeds a defined limit value, and
 - eliminating the system slacks in the direction of a lowering of the window when the vehicle traveling speed falls below the defined limit value.

10. Method according to claim 1, wherein said method includes:
 - detecting a vehicle traveling speed,
 - partially eliminating the system slacks in the direction of a lifting of the window when the vehicle traveling speed exceeds a defined limit value, and
 - eliminating the system slacks in the direction of a lowering of the window when the speed of the vehicle falls below a defined limit value.

11. Apparatus for controlling opening and closing movements of a window in a frameless vehicle door having an operating device operable to move the window between an upper closed position with the window engaged against a vehicle body side elastic seal and a lower open position out of engagement with the elastic seal, said apparatus comprising:
 - means for determining system slacks in the operating device of the window,
 - means for detecting an unlocking of the vehicle door, and
 - means for eliminating the system slacks in a direction of lowering the window as a function of unlocking the vehicle door.

12. Apparatus according to claim 11, wherein the means for determining system slacks includes:
 - means for monitoring the movement of the window in a lifting direction toward the upper closed position,
 - means for determining driving movement of the operating device when the window is essentially no longer moved after reaching the upper closed position, and
 - means for storing this driving movement as a system slack.

13. Apparatus according to claim 11, wherein the means for determining system slacks include:
 - means for monitoring the movement of the window in the sense of a reversal of the moving direction,
 - means for monitoring the movement of the window if a reversal of the moving direction is detected,
 - means for determining the driving movement of the operating device from the point in time of the reversal of the moving direction to the detecting of a driving movement of the window, and
 - means for storing this driving movement as a system slack.

14. Apparatus according to claim 13, comprising:

means for a partial elimination of the system slacks in the direction of a lifting of the window when a speed of the vehicle exceeds a defined limit value, and means for an elimination of the system slacks in the direction of a lowering of the window when the speed of the vehicle falls below a defined limit value.

15. Apparatus according to claim 11, comprising:

means for an at least partial lowering of the window when a door opener is operated, means for completely lifting the window when a door is closed and the door opener is not operated, and means for eliminating the system slacks in the direction of a lowering of the window.

16. Apparatus according to claim 15, comprising:

means for a complete lifting of the window when a speed of the vehicle exceeds a defined limit value, and means for eliminating the system slacks in the direction of a lowering of the window when the speed of the vehicle falls below the defined limit value.

17. A vehicle comprising:

a frameless vehicle door which is movable between and open and closed positions, a vehicle body side elastic seal having a groove opening downwardly, a window in said door, an operating device operable to move the window between a lower open position and an upper closed position such that, with a closed vehicle door, said window is engaged in said groove opening of the elastic seal when in its upper closed position to thereby prevent opening of the door, and a control system for the operating device comprising:

means for determining system slacks in the operating device of the window, means for detecting an unlocking of the vehicle door, and means for eliminating the system slacks in a direction of lowering the window as a function of unlocking the vehicle door.

18. A vehicle according to claim 17, wherein the means for determining system slacks includes:

means for monitoring the movement of the window in a lifting direction toward the upper closed position, means for determining driving movement of the operating device when the window is essentially no longer moved after reaching the upper closed position, and means for storing this driving movement as a system slack.

19. A vehicle according to claim 17, wherein the means for determining system slacks include:

means for monitoring the movement of the window in the sense of a reversal of the moving direction, means for monitoring the movement of the window if a reversal of the moving direction is detected, means for determining the driving movement of the operating device from the point in time of the reversal of the moving direction to the detecting of a driving movement of the window, and means for storing this driving movement as a system slack.

20. Apparatus according to claim 17, comprising:

means for an at least partial lowering of the window when a door opener is operated, means for completely lifting the window when a door is closed and the door opener is not operated, and means for eliminating the system slacks in the direction of a lowering of the window.

21. A vehicle according to claim 20, comprising:

means for a complete lifting of the window when a speed of the vehicle exceeds a defined limit value, and means for eliminating the system slacks in the direction of a lowering of the window when the speed of the vehicle falls below the defined limit value.

22. A vehicle according to claim 19, comprising:

means for a partial elimination of the system slacks in the direction of a lifting of the window when a speed of the vehicle exceeds a defined limit value, and means for an elimination of the system slacks in the direction of a lowering of the window when the speed of the vehicle falls below a defined limit value.

* * * * *